(12) United States Patent
Steinmann et al.

(10) Patent No.: US 12,409,916 B2
(45) Date of Patent: Sep. 9, 2025

(54) GYROSTABILISER ASSEMBLY

(71) Applicant: VEEM Ltd, Canning Vale (AU)

(72) Inventors: Paul Douglas Steinmann, Canning Vale (AU); Michael John Andrewartha, Canning Vale (AU); John Bradley Miocevich, Canning Vale (AU)

(73) Assignee: VEEM Ltd. (AU)

( * ) Notice: Subject to any disclaimer, the term of this patent is extended or adjusted under 35 U.S.C. 154(b) by 0 days.

(21) Appl. No.: 17/909,526

(22) PCT Filed: Mar. 5, 2021

(86) PCT No.: PCT/AU2021/050197
§ 371 (c)(1),
(2) Date: Sep. 6, 2022

(87) PCT Pub. No.: WO2021/174315
PCT Pub. Date: Sep. 10, 2021

(65) Prior Publication Data
US 2023/0134259 A1    May 4, 2023

(30) Foreign Application Priority Data

Mar. 6, 2020  (AU) ................................ 2020900700

(51) Int. Cl.
*B63B 39/04* (2006.01)
*F16N 7/40* (2006.01)
*F16N 17/06* (2006.01)

(52) U.S. Cl.
CPC .............. *B63B 39/04* (2013.01); *F16N 7/40* (2013.01); *F16N 17/06* (2013.01); *F16N 2210/14* (2013.01)

(58) Field of Classification Search
CPC ........ F16N 2210/14; F16N 7/40; F16N 17/06; B63B 39/04
(Continued)

(56) References Cited

U.S. PATENT DOCUMENTS 1,418,330 A    6/1922  Schein
1,590,778 A    6/1926  Schein
(Continued)

FOREIGN PATENT DOCUMENTS

CN           204408103       6/2015
WO    WO-2019224322 A1  * 11/2019  ............. B63B 39/04

*Primary Examiner* — Randell J Krug
(74) *Attorney, Agent, or Firm* — Endurance Law Group PLC

(57) ABSTRACT

A gyrostabiliser assembly for a marine vessel comprising: a housing defining a chamber for supporting at least a partial vacuum; a flywheel mounted within the chamber for rotation about a spin axis at the partial vacuum; a flywheel shaft upon which the flywheel is supported and mounted in the housing for rotation of the flywheel about the spin axis, the flywheel shaft being rotatably supported by a first spin bearing located at one end region of the shaft and a second spin bearing located at an opposite end region of the shaft; and a lubrication system configured to circulate lubricant to the spin bearings from a lubricant reservoir. The reservoir is arranged in or on the housing to collect lubricant from the spin bearings under gravity and the first and second spin bearings are arranged in the housing for operation under the partial vacuum.

21 Claims, 3 Drawing Sheets

(58) Field of Classification Search
USPC .......................................................... 74/5.95
See application file for complete search history.

(56) References Cited

U.S. PATENT DOCUMENTS

| | | | |
|---|---|---|---|
| 2007/0157749 A1* | 7/2007 | Adams | F16C 37/007 |
| | | | 74/5.12 |
| 2018/0051988 A1 | 2/2018 | Miocevich et al. | |
| 2019/0367138 A1 | 12/2019 | Smith et al. | |

* cited by examiner

GYROSTABILISER ASSEMBLY

FIELD OF THE INVENTION

The present invention relates to a gyrostabiliser assembly, and particularly to a lubrication system for bearings in a gyrostabiliser assembly.

The gyrostabiliser assembly of the invention will typically be designed for use in a marine vessel and it will be convenient to describe the invention in this exemplary context. It will be appreciated, however, that the gyrostabiliser assembly of the invention is not limited to such a particular embodiment and may be designed for use in many other applications, such as in other fixed and floating structures, other vehicles and/or camera mountings.

BACKGROUND OF THE INVENTION

The following discussion of background in this specification should in no way be considered an admission that such background is prior art or that such background is well known or forms part of the common general knowledge in the field in Australia or in any other country.

The structure and operation of marine gyrostabiliser assemblies are generally quite well understood and these devices are gaining increasing adoption in commercial and recreational marine vessels. A gyrostabiliser assembly will typically comprise a spinning flywheel mounted in a gimbal frame that allows two of the three possible rotational degrees of freedom, and the frame is rigidly mounted within the vessel. The specific way in which the flywheel is constrained in rotational motion allows the angular momentum of the spinning flywheel to combine with the flywheel's precession oscillation to generate large torques that vary with time to directly oppose a dynamic rolling motion of the vessel caused by wind and/or waves. Without any intervention, the vessel rolling motion combines with the flywheel angular momentum to cause oscillating precession motion. This then combines with the angular momentum to create a stabilising torque, which directly opposes undesirable rotational motion (e.g. wave-induced rolling motion) of the vessel. By arranging the gimbals in a specific way, a roll-stabilising device is created using the naturally occurring physics of gyro-dynamics which requires no further intervention to function. An example of a marine gyrostabiliser assembly is described in the present applicant's co-pending Australian patent application AU 2017216483 A1, the contents of which are incorporated herein in their entirety by direct reference.

Due to the high velocity of an outer rim of the flywheel in a gyrostabiliser, the gimbal frame will often comprise a chamber enclosing the flywheel that is evacuated to enable the flywheel to spin within a vacuum. This reduces the aerodynamic drag on the flywheel, reducing power required to maintain the flywheel speed (rpm). It also reduces heat generated by air resistance to the spinning flywheel rim, which in turn improves efficiency. The spin bearings that are used to locate and hold the flywheel about a spin axis are subject to both high loads and high rotational speeds which also generate heat and noise. The spin bearings and spin motor are typically located within the vacuum chamber to avoid issues associated with sealing the vacuum chamber where the spin shaft exits the vacuum chamber. However, having the spin bearings inside the vacuum chamber can make it difficult to lubricate those bearings, as well as to cool the bearings. It can be particularly difficult to cool an inner part of the spin bearings and the flywheel shaft because these are rotating and cannot easily be cooled via contact with a coolant jacket.

The co-pending Australian patent application AU 2017216483 A1 describes an arrangement having an oil lubrication system for lubricating and cooling the bearings, with which an oil flowrate to the bearings can be selected to provide both lubrication and an exchange of heat generated by the bearings into the oil. The oil lubrication system is desirable for reduced noise, extended bearing life, and the ability to remove heat from inner part of the bearings. In this system, the oil is drawn from a sump by one or more scavenge pumps in an arrangement analogous to a 'dry sump' pump arrangement on racing cars. To allow the scavenge pumps to operate, the arrangement separates an upper bearing chamber and a lower bearing chamber from the vacuum chamber that encloses the flywheel by rotary shaft seals on the flywheel shaft. One seal is below the upper bearing chamber and the other seal is above the lower bearing chamber, with the upper and lower bearing chambers manifolded together by drain lines between them. With this arrangement, the flywheel can spin in a partial- or near-vacuum at sufficiently low pressure that air resistance is substantially reduced or eliminated, while the bearing-housings (which are manifolded so that they operate at the same pressure) are able to operate at a sufficiently high pressure for the scavenge pumps to pump the oil to the spin bearings effectively.

However, the arrangement described in AU 2017216483 A1 has disadvantages in that it requires a dual vacuum pressure management system for the vacuum chamber and the bearing chambers, and in that the rotary shaft seal components are subject to rotational resistance from the high contact surface velocities, which leads to wear and to associated costs of maintenance and/or later replacement, as well as to higher power requirements to maintain the desired flywheel speeds (rpm).

It would therefore be desirable to provide a new gyrostabiliser arrangement that substantially overcomes or ameliorates one or more of the above disadvantages. In this regard, it would be desirable to provide a new gyrostabiliser arrangement that employs an oil lubrication system for lubricating and cooling the bearings and is less complex.

SUMMARY OF THE INVENTION

According to one broad aspect, therefore, the invention provides a gyrostabiliser assembly comprising:

a housing defining a chamber for supporting an operating pressure;

a flywheel mounted within the chamber for rotation about a spin axis at the operating pressure;

a flywheel shaft upon which the flywheel is supported and mounted in the housing by a first spin bearing and second spin bearing located at opposite end regions of the shaft for rotation of the flywheel about the spin axis; and a lubrication system for the first and second spin bearings configured to supply or circulate lubricant to the bearings from a reservoir. The lubricant reservoir is arranged in or on the housing to collect lubricant from the first and second spin bearings under gravity. The first and second spin bearings are arranged in the housing at the operating pressure, or for use/operation at the operating pressure (e.g. if the operating pressure were to be applied only in use).

In this way, the invention is able to provide a considerably simpler arrangement or construction of the gyrostabiliser assembly in which rotary shaft seals separating or isolating the spin bearings from the operating pressure of the flywheel chamber are not required. This has the advantage that it removes a need for a dual vacuum pressure management system and simplifies the arrangement by reducing the number of components and the points of possible failure, thereby making the gyrostabiliser assembly more reliable and robust. In particular, the arrangement removes the need for rotary shaft seals, which are subject to wear, saving on the time and cost of maintaining and/or replacing the seals. As the shaft seals typically produce significant rotational resistance, the new arrangement also reduces the power required to maintain the flywheel speed (rpm) and removes flywheel speed limitations imposed by the capacity of the shaft seals to cope with high contact surface velocities.

In a preferred embodiment, the first and second spin bearings are configured and arranged within the housing such that the lubricant supplied, circulated or delivered to the first and second bearings drains out of each respective bearing for return to the reservoir under gravity. In this regard, it will be appreciated that the lubricant is a liquid under the operating pressure and temperature. The lubricant will typically comprise oil, such as a synthetic oil.

It will be appreciated that the term "spin bearing" used throughout this document is understood as a reference to a bearing designed to mount or support the flywheel shaft for rotation, preferably free rotation, about the spin axis. As such, the term "spin bearing" will be understood as a rotary bearing and will include a range of rotary bearing designs, including a hydrodynamic bearing and a rolling-element bearing.

In a preferred embodiment, the first and second spin bearings are configured as rolling-element bearings; e.g. with an inner race for the rolling elements rigidly attached to the flywheel shaft for rotation with the shaft and an outer race rigidly secured with respect to the housing. In an alternative embodiment, the first and second spin bearings may be configured as plain bearings; e.g. plain hydrodynamic bearings.

In a preferred embodiment, the operating pressure is an at least partial vacuum such that the chamber within which the flywheel is mounted forms a vacuum chamber. Placing the chamber that contains the flywheel and bearings under an at least partial vacuum (e.g. less than 0.5 bar, preferably less than 0.25 bar) is preferred because this reduces aerodynamic drag on the flywheel, thereby reducing power required to maintain flywheel speed (rpm) while reducing heat generated by air resistance to the spinning flywheel. In this way, the whole vacuum chamber in the gyrostabiliser assembly forms a single chamber operating at one vacuum pressure. The vacuum pressure should be sufficiently low as to substantially reduce or remove any air resistance, and the resulting heat generation. Testing and experience suggest that the operating pressure should be preferably less than or equal to about 0.2 bar.

In a preferred embodiment, the lubrication system comprises a lubricant circuit via which the lubricant is circulated from the reservoir to the bearings and then back to the reservoir. In this connection, the lubrication system comprises at least one pump for circulating the lubricant from the reservoir to the first and second spin bearings. The at least one pump is preferably in the form of a positive displacement pump, and the pump is desirably arranged such that the lubricant in the reservoir provides positive pressure head at an inlet of the pump. To this end, the pump may be arranged submerged in the lubricant within the reservoir. Alternatively, the pump may be arranged in or on the housing with a pump inlet in fluid communication with the reservoir at a level spaced below a level of the lubricant held in the reservoir. This arrangement may significantly simplify the lubrication system known from co-pending application AU 2017216483 A1. That is, rather than employing both a sump or collection tank for de-aeration of the lubricant (e.g. oil) and a separate reservoir for the deaerated oil from the sump, together with both an oil return pump for returning oil from the sump to the reservoir and a supply pump for delivering oil from the reservoir to the spin bearings, the present arrangement may make it possible to eliminate the need for a separate tank for de-aerating the oil prior to an inlet of the supply pump and may thus also eliminate a need for a separate return pump. That is, the de-aeration of the oil may desirably take place in the reservoir, which also forms a sump or collection tank for the oil. That is, the reservoir may function as a contaminant settling tank, de-aeration tank, as well as a cooling tank for the oil.

In a preferred embodiment, the lubrication system comprises lubricant delivery outlet, especially a lubricant jetting outlet, for targeted delivery or injection of lubricant at each of the first and second bearings. Thus, the lubrication system may comprise an 'oil jet' system. The oil flowrate is desirably selected to provide both lubrication and to allow exchange of heat generated at the bearings into the oil. The oil injection via jetting outlets ensures that the oil can be targeted at rolling elements or sliding elements in the spin bearings with sufficient velocity and pressure that it mixes with the boundary layer oil to provide effective lubrication as well as a cooling effect. The pump for delivering the lubricant (i.e. oil) from the reservoir to the first and second spin bearings is therefore designed such that it can prime and deliver the necessary back pressure to drive the oil with the required speed through the oil delivery outlets. By carefully selecting the pump to deliver the required pressure and flow, the pump can be arranged and sized to meet the required conditions for circulating the oil through one or more filters and/or one or more heat exchangers in the oil circuit, and then through the oil delivery outlets.

In a preferred embodiment, therefore, the lubrication system may form a cooling system for the spin bearings. In particular, the oil may act as a coolant to carry heat away from the first and second bearings. To this end, the oil circuit preferably includes one or more heat exchanger for removing heat from the oil before the oil is delivered to the first and second spin bearings. In this regard, walls of the housing may form a heat exchanger for the oil, optionally via a cooling medium provided in the walls (e.g. a water jacket) of the housing, and/or optionally via fin elements formed in the walls, as the oil returns to the reservoir under gravity and/or is circulated to the spin bearings from the reservoir. This heat may then be discharged (e.g. overboard) as heated cooling water. Having the lubricant (oil) de-aerated at the point of delivery to the bearings is beneficial as it ensures that the delivery outlets function to provide a directed jet with sufficient velocity to break into the boundary layer to provide the necessary mixing and also improves heat transfer through heat exchangers. The oil will usually also need to be filtered prior to re-injection.

Both horizontal and vertical orientations of the flywheel shaft are contemplated for the gyroscope assembly of the present invention, and each provides challenges for lubrication in terms of getting the lubricant (e.g. oil) to the respective spin bearings and then recovering the lubricant for re-application.

In a preferred embodiment, the flywheel shaft is mounted in a generally vertical orientation within the housing for rotation about a generally vertical spin axis. The first and second bearings therefore form an upper spin bearing and a lower spin bearing, respectively. A vertical flywheel shaft orientation is preferred as this allows the housing to be set up as a pendulum having a natural point of stability near vertical. This means that no extra mechanism is required to ensure that a precession angle of the gyroscope assembly remains 'centred' around a mid-stroke. The oil returning from the upper and lower bearings is thus directed to a common reservoir or sump at a lower region or base of the housing below the vacuum chamber. The oil in the reservoir may be scavenged and then circulated by at least one pump located either in or adjacent to the reservoir.

In a preferred embodiment, the lubrication system includes two or more outlet ports from the reservoir located at different positions and in fluid communication with the pump inlet for ensuring circulation of the lubricant to the spin bearings irrespective of an operational position of the gyroscope assembly. That is, the reservoir outlet ports can be located to ensure that the lubricating oil is always pumped or circulated effectively despite movement of the oil within the reservoir as the gyroscope assembly swings or moves (e.g. as a pendulum) during operation. For example, the housing may swing or rotate through +/−70 degrees during operation which could cause the oil in the reservoir to move away from a single outlet port. By providing two or more outlet ports in different positions (e.g. at different sides in the reservoir) and in communication with an inlet to the pump, this can ensure that at least one outlet port from the reservoir is flooded at any time, so that the oil can be circulated effectively.

In a preferred embodiment, the gyroscope assembly comprises a member, such as a disc-shaped member, securely or rigidly attached to the flywheel shaft for rotation therewith and arranged below the upper spin bearing for catching oil that flows down from the upper spin bearing under gravity. This member is thus designed for distributing that oil radially outwards onto inner walls of the housing enclosing the flywheel chamber for return to the reservoir under gravity. In this regard, the high rotational speed of the disc member spinning with the flywheel shaft acts to accelerate the oil radially outwards via centrifugal effect onto the inner walls of the housing where it can flow down to the reservoir under gravity. Alternatively, or in addition, the flywheel may include one or more channels formed therethrough, e.g. in the vicinity of the shaft, which define a flow path for collecting and guiding the oil that flows down from the upper spin bearing under gravity back towards the reservoir. In view of the need for rotational stability of the flywheel, the channels are desirably identical and symmetrically arranged around the spin axis. Due to the high stresses in the flywheel, however, such channels may be impractical in some cases. In the absence of a disc member and/or any channel through the flywheel, lubrication oil from the upper spin bearing can flow directly down onto the flywheel and radially outwards over an outer rim of the flywheel to the housing walls, before then flowing to the oil reservoir at the base of the housing.

In a preferred embodiment, the gyroscope assembly comprises a spin motor for driving rotation of the flywheel about the spin axis. In one embodiment, the spin motor is mounted within the chamber. In an alternative embodiment, the spin motor is mounted outside of the chamber and is coupled to the flywheel shaft via either a magnetic sealed coupling or a shaft connection. If a shaft connection is required to a spin motor mounted outside of the chamber, this will again require a rotary shaft seal. An advantage here, however, is that the shaft connecting the spin motor to the flywheel shaft only needs to transmit a relatively small torque and can therefore be relatively small in diameter. This, in turn, limits the seal contact surface velocities (reduced circumference at a given rpm leads to lower velocities), which substantially extends the possible rpm before the seal capacity become limiting, and reduces the rotational resistance of the seal. By contrast, in the current arrangement the rotary shaft seals are provided on the flywheel shaft that must withstand the full gyro-torque fully reversing at each rpm cycle. The shaft diameter and circumference are thus much greater, leading to higher contact surface velocities, higher wear, and technical challenges with extended seal life.

According to another aspect, the invention provides a gyrostabiliser assembly for a marine vessel comprising: a housing defining a chamber for supporting at least a partial vacuum; a flywheel mounted within the chamber for rotation about a spin axis at the partial vacuum; a flywheel shaft upon which the flywheel is supported and mounted in the housing for rotation of the flywheel about the spin axis, the flywheel shaft being rotatably supported by a first rotary bearing located at one end region of the shaft and a second rotary bearing located at an opposite end region of the shaft; and a lubrication system configured to supply lubricant to the rotary bearings from a lubricant reservoir. The reservoir is arranged in or on the housing to collect lubricant from the bearings under gravity. The first and second rotary bearings are arranged in the housing under the partial vacuum or for use/operation under the partial vacuum (e.g. if the vacuum were to be applied only in use).

Because, as noted above, the structure and operation of marine gyrostabilizers are generally quite well-understood, this specification does not aim to provide a detailed description of all of the components of a gyrostabiliser assembly, such as the flywheel, flywheel shaft, gimbal bearings, or the like. Rather, this specification directs the skilled reader to other publications for a description or explanation of those components.

According to another aspect, the present invention provides a marine vessel, such as a boat, that includes or incorporates a gyrostabiliser assembly of the invention according to any one of the embodiments described above.

It will be appreciated that the term "gyrostabiliser assembly" as used throughout this document is understood as referring to a gyrostabiliser apparatus or gyrostabiliser unit which may be incorporated or installed in a vehicle, such as a marine vessel, or in some other device subject to undesirable rotational motions (like wave-induced rolling motion) in order to counteract and/or reduce such undesirable motions.

BRIEF DESCRIPTION OF THE DRAWINGS

For a more complete understanding of the invention and advantages thereof, exemplary embodiments of the invention are explained in more detail in the following description with reference to the accompanying drawing figures, in which like reference signs designate like parts and in which.

The accompanying drawings are included to provide a further understanding of the present invention and are incorporated in and constitute a part of this specification. The drawings illustrate particular embodiments of the invention and, together with the description, serve to explain the principles of the invention. Other embodiments of the invention and many of the attendant advantages will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. Furthermore, it will be noted that the elements of the drawings are not necessarily illustrated to scale relative to each other. It will also be understood that certain actions or steps in an embodiment of a method may be described or depicted in a particular order of occurrences while those skilled in the art will understand that such specificity with respect to sequence is not actually required.

DETAILED DESCRIPTION OF THE EMBODIMENTS

Figure 1:
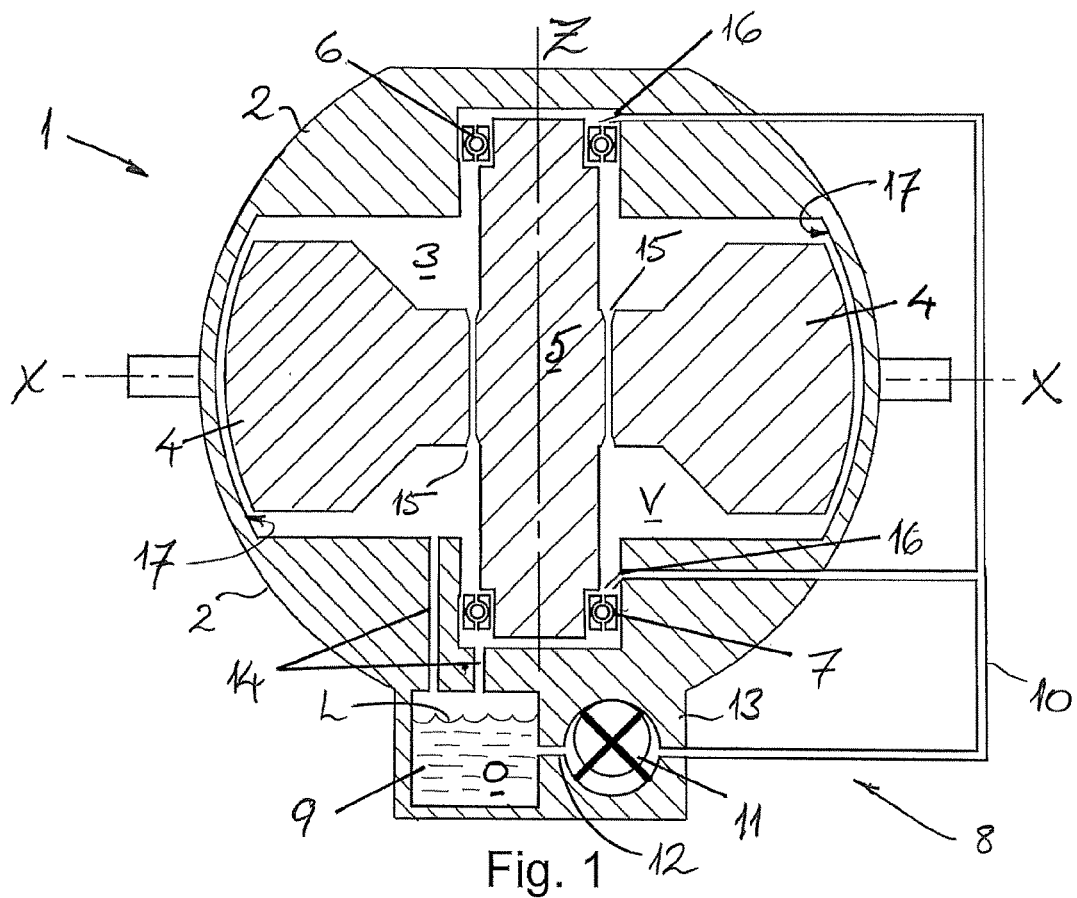
FIG. 1 is a schematic cross-sectional side view of a gyrostabiliser assembly according to a preferred embodiment of the invention.

With reference to FIG. 1 of the drawings, a gyrostabiliser assembly 1 according to a preferred embodiment is illustrated. The gyrostabiliser assembly 1 has a housing 2 that defines a vacuum chamber 3 for supporting a partial vacuum V (e.g. of less than or equal to about 0.2 bar) as an operating pressure, and a flywheel 4 integral with or fixed on a generally vertically oriented flywheel shaft 5 which is mounted within the vacuum chamber 3 for rotation at the operating pressure about a generally vertical spin axis or rotational axis Z. The flywheel shaft 5, upon which the flywheel 4 is fixed and supported, is mounted in the housing 2 via upper and lower rotary bearings 6, 7 (also referred to as "spin bearings") located at opposite end regions of the shaft 5 for rotation of the flywheel 4 about the spin axis Z. In this embodiment, the upper and lower bearings 6, 7 are in the form of rolling-element bearings with rolling elements (e.g. steel balls) held and movable between an inner race securely fixed to the shaft 5 and an outer race securely fixed to the housing 2. The vertical orientation of the flywheel shaft 5 and spin axis Z allows the housing 2 to be set up or mounted as a pendulum about the pivot axis X with a natural point of stability near vertical. As a result, no mechanism is needed to ensure that a precession angle of the gyroscope assembly 1 remains centred around a mid-stroke. The gyroscope assembly 1 comprises an electric drive motor or spin motor (not shown) for driving rotation of the flywheel 4 about the spin axis Z and the spin motor is mounted in or on the housing 2.

The gyrostabiliser assembly 1 further includes a lubrication system 8 (oil-based) for the upper and lower spin bearings 6, 7 configured to circulate oil O to each of the bearings 6, 7 from an oil reservoir 9. The lubrication system 8 therefore provides an oil circuit 10 via which the oil O is circulated from the oil reservoir 9 to the respective spin bearings 6, 7 and then back to the reservoir 9. The oil circuit 10 may comprise lines or conduits both within and/or external to the housing 2, though which the oil O is delivered or supplied to each of the bearings 6, 7 from the oil reservoir 9. The upper and lower spin bearings 6, 7 are configured and arranged within the housing 2 such that the oil O circulated or delivered to the spin bearings 6, 7 drains out of each respective bearing 6, 7 for return to the reservoir 9 under gravity. In this connection, the lubrication system 8 includes at least one pump 11 for circulating or delivering the oil from the reservoir 9 to the upper and lower bearings 6, 7. The at least one pump 11 is a positive displacement pump, such as a gear pump, and is arranged such that the oil O in the reservoir 9 provides a positive pressure head at an inlet 12 of the pump. To this end, the pump is arranged in or on the housing 2 with the pump inlet 12 in fluid communication with the reservoir 9 at a level spaced below a level L of the oil held in the reservoir 9. The vertical orientation of the spin axis Z means that oil O returning from upper and lower bearings 6, 7 is directed to the common reservoir 9 (or sump). The reservoir 9 is located in a base 13 of the housing 2 below the vacuum chamber 3 to collect the oil via return lines or conduits 14 from the upper and lower spin bearings 6, 7 under gravity, with the spin bearings 6, 7 provided in the housing 2 at the operating pressure V. In this way, the vacuum chamber 3 is a single chamber operating at one pressure V. This not only reduces the aerodynamic drag on the flywheel 4, to reduce both the power required to maintain flywheel speed (rpm) and the heat generated by air resistance to the spinning flywheel 4, but also results in a simpler arrangement of the gyrostabiliser assembly 1 in which rotary shaft seals for isolating the upper and lower spin bearings 6, 7 from the operating pressure V of the flywheel chamber 3 are not required.

Referring further to FIG. 1, it will be seen that the flywheel 4 has channels 15 formed there-through in the vicinity of the shaft 5 that form a flow path for collecting and guiding the oil that flows down from the upper spin bearing 6 under gravity back towards the reservoir 9. In the absence of such channels 15 through the flywheel 4, lubrication oil from the upper spin bearing 6 would flow directly down onto the flywheel 4 and then radially outwards over an outer peripheral rim of the flywheel under centrifugal action, before then flowing to the oil reservoir 9 in the base 13 of the housing 2.

The oil lubrication system 8 includes an oil jetting outlet 16 at each of the upper and lower spin bearings 6, 7 for targeted delivery or injection of the oil by the at least one pump 11. The oil flowrate is selected to provide both lubrication and an exchange of heat generated at the bearings 6, 7 into the oil. The oil lubrication system 8 therefore also forms a cooling system for the spin bearings 6, 7 in which the oil acts as a coolant to carry heat away from the bearings. In particular, the oil injection via jetting outlets 16 ensures that the oil is targeted at the rolling elements in the bearings 6, 7 with sufficient velocity and pressure so that it mixes with boundary layer oil for effective lubrication as well as a cooling effect. To this end, the oil circuit 10 typically includes one or more heat exchanger for removing heat from the oil before the oil O is delivered to the upper and lower bearings 6, 7. In this regard, walls 17 of the housing 2 enclosing the chamber 3, onto an inner surface of which walls 17 the oil will be 'flung' via centrifugal action of the flywheel 4, may form or act as a heat exchanger for the oil O, optionally via a cooling medium provided in the walls 17 (e.g. in the manner of a water jacket) and/or via fin elements (not shown) formed in the walls 17, as the oil returns to the reservoir 9 under gravity. The oil circuit 10 typically also includes one or more filter (not shown) for filtering the oil prior to re-injection at the jetting outlets 16.

Figure 2:
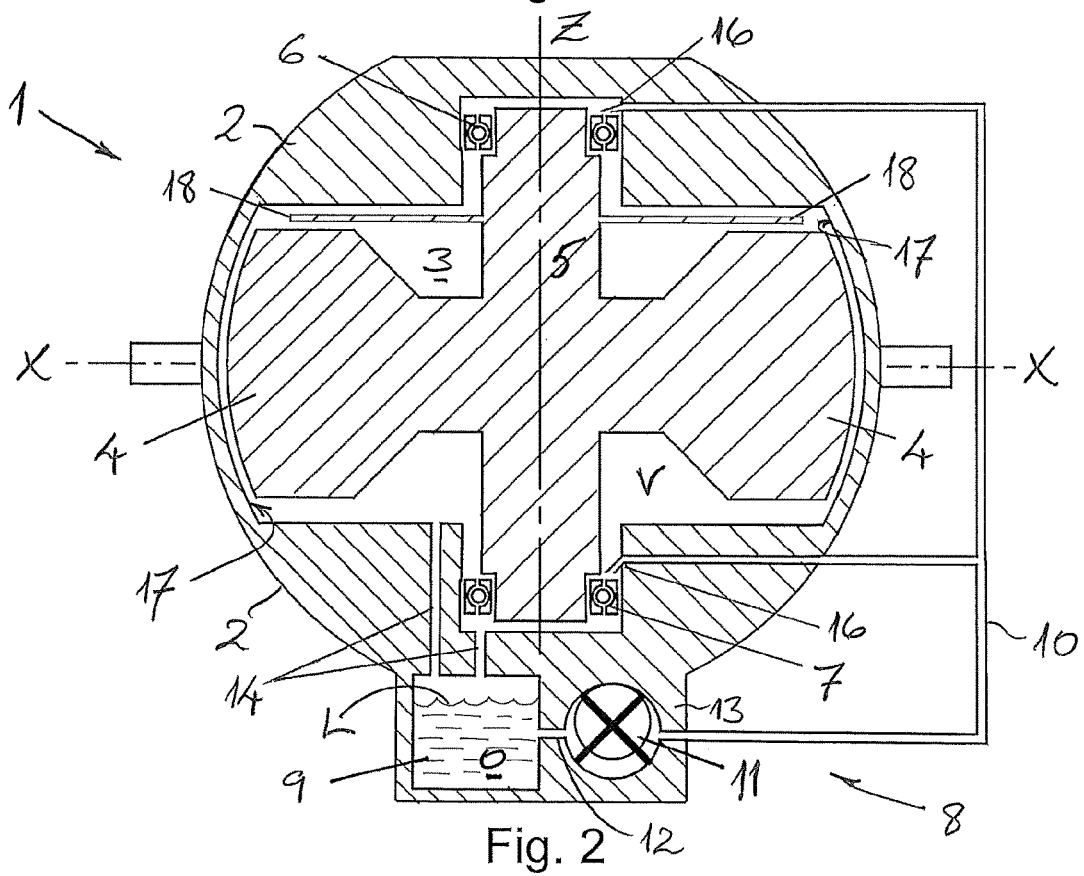
FIG. 2 is a schematic cross-sectional side view of a gyrostabiliser assembly according to another preferred embodiment of the invention.

With reference to FIG. 2 of the drawings, a gyrostabiliser assembly 1 according to another preferred embodiment is illustrated. This embodiment has most of the same features as the gyrostabiliser assembly 1 shown in FIG. 1. In this embodiment, however, there are no channels 15 provided through the flywheel 4, so ensuring greater rotational stability of the flywheel 4. Instead, a disc member 18 is rigidly attached to the flywheel shaft 5 for rotation therewith above the flywheel 4 but below the upper spin bearing 6 for catching oil that flows down from the upper bearing 6 under gravity. In this way, the disc member 18 operates to distribute (Ting') that oil radially outwards onto inner walls 17 of the housing 2 enclosing the flywheel chamber 3 for return to the reservoir 9 under the action of gravity. In this regard, the high rotational speed of disc member 18 spinning with the flywheel shaft 5 acts to accelerate the oil radially outwards via the centrifugal force onto the inside of walls 17 of the housing 2 where it can then flow down and into the reservoir 9 under gravity.

Figure 3:
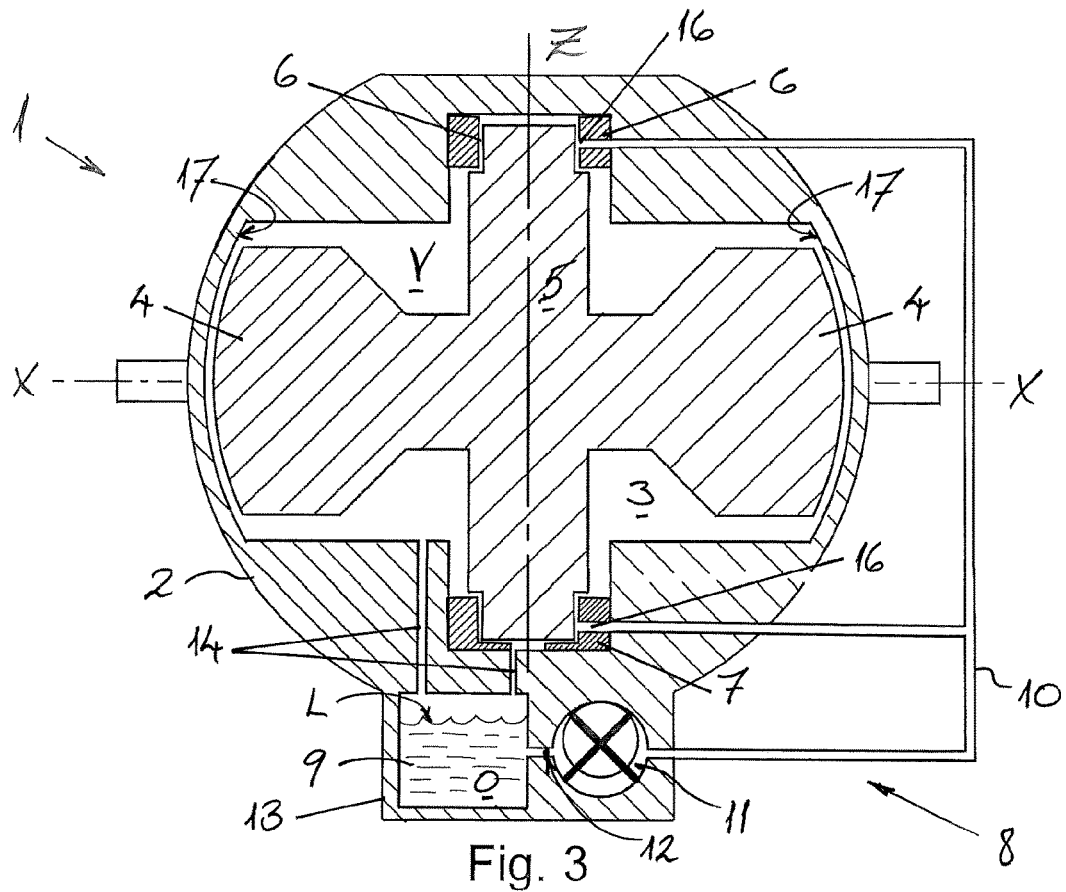
FIG. 3 is a schematic cross-sectional side view of a gyrostabiliser assembly according to a further preferred embodiment of the invention.

Referring now to FIG. 3 of the drawings, a gyrostabiliser assembly 1 according to a further preferred embodiment is illustrated. This embodiment has most of the same features as the gyrostabiliser assembly 1 shown in FIG. 2, but without the disc-shaped member 18 for distributing the oil radially outwards onto the walls 17 enclosing the flywheel chamber 3. Instead, in this case, the flywheel 4 itself operates to 'fling' the oil O onto the walls 17. Another difference to the embodiment of FIG. 2 resides in the fact that, instead of rolling-element bearings, the upper and lower rotary bearings 6, 7 are provided as plain hydrodynamic bearings. These bearings are simpler in construction to roller bearings and typically also less costly and more durable. The oil is delivered to these upper and lower plain hydrodynamic spin bearings 6, 7 via the lines or conduits of the oil circuit 10 in the same manner as for the embodiments of FIGS. 1 and 2.

Figure 4:
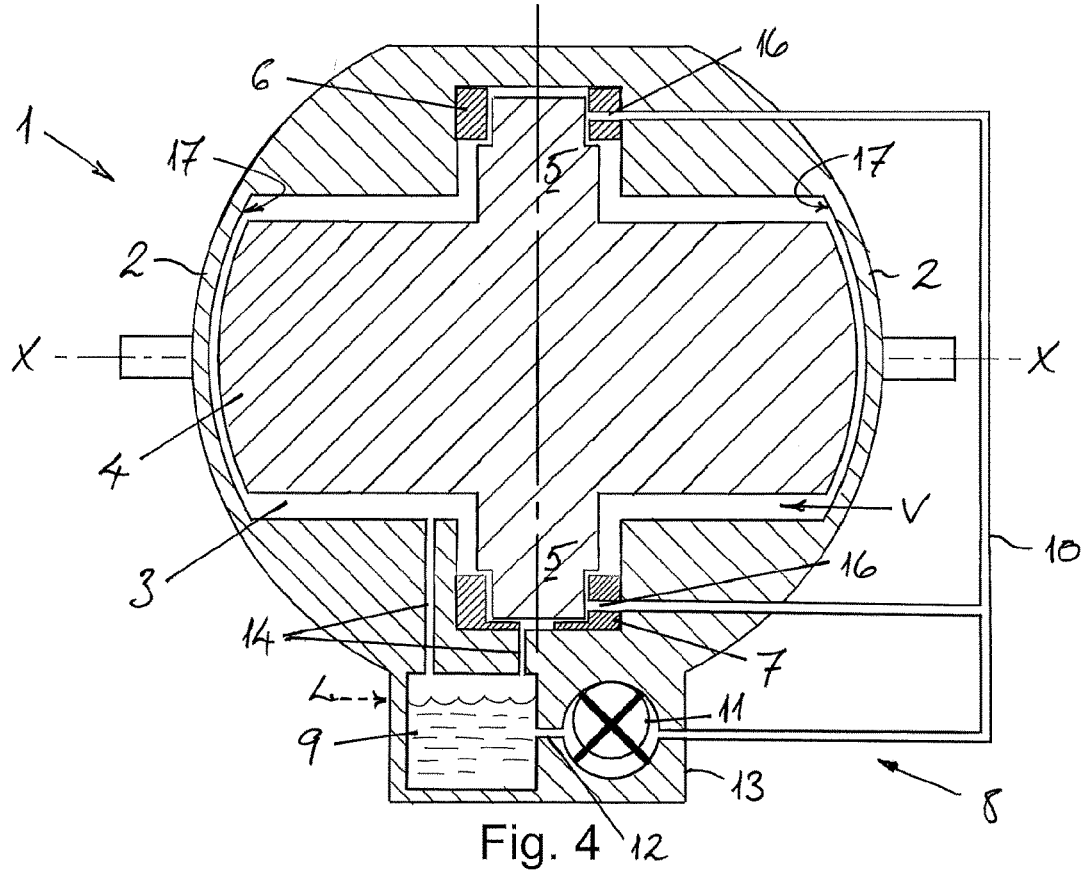
FIG. 4 is a schematic cross-sectional side view of a gyrostabiliser assembly according to yet another preferred embodiment of the invention.

With reference to FIG. 4 of the drawings, a gyrostabiliser assembly 1 according to yet another preferred embodiment is shown. This embodiment differs from the one shown in FIG. 3 in that the flywheel 4 has a substantially uniform cross-section (i.e. with no reduced thickness adjacent the flywheel shaft 5). This configuration serves to make the flywheel 4 more massive for a given diameter which, though less efficient, increases angular momentum. This is useful if the gyrostabiliser assembly 1 is constrained in size (i.e. constrained in diameter) such as when it is to be integrated into an outboard motor. This configuration also prevents oil from pooling on an upper side of the flywheel when the gyrostabiliser assembly 1 is not in operation (i.e. stopped).

Figure 5:
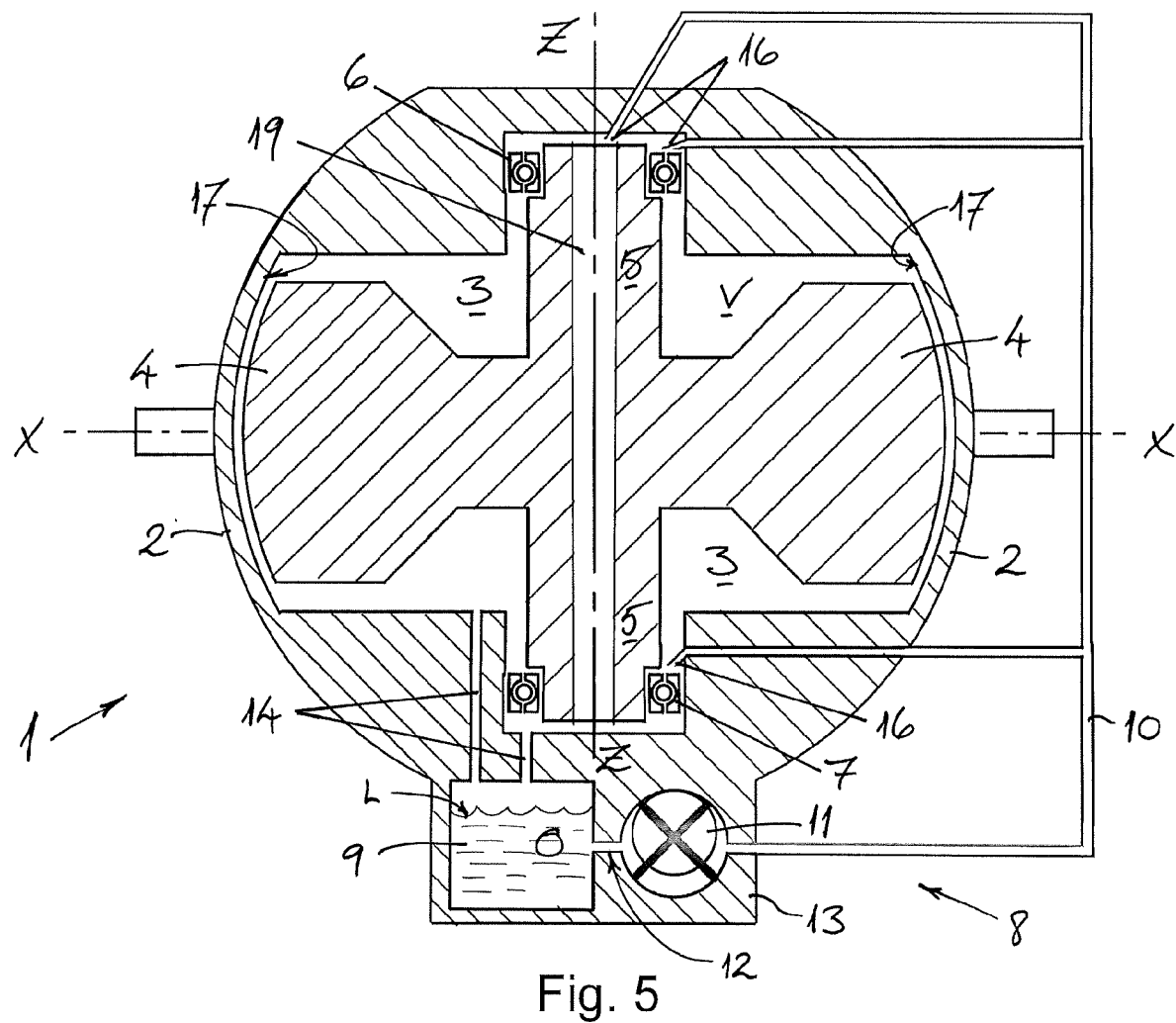
FIG. 5 is a schematic cross-sectional side view of a gyrostabiliser assembly according to yet a further preferred embodiment of the invention.

Finally, with reference now to FIG. 5 of the drawings, a gyrostabiliser assembly 1 according to yet a further preferred embodiment is shown. This embodiment differs from the embodiment shown in FIG. 2 in that the flywheel shaft 5 has no disc member 18 but the flywheel shaft 5 is hollow or has a central channel 19 for receiving lubrication oil O from the oil circuit 10 to provide cooling of the inner bearing race of each of the upper and lower spin bearings 6, 7. In this regard, as described with reference to FIG. 1, the upper and lower spin bearings 6, 7 in this embodiment are rolling-element bearings with the roller elements (e.g. steel balls) held and movable between an inner race securely fixed to the shaft 5 and an outer race securely fixed to the housing 2. The oil circulating through the central channel 19 of the flywheel shaft 5, e.g. via an injection outlet 16, may therefore act to cool the inner bearing race securely fixed to the shaft 5.

Although specific embodiments of the invention are illustrated and described herein, it will be appreciated by persons of ordinary skill in the art that a variety of alternative and/or equivalent implementations exist. It should be appreciated that each exemplary embodiment is an example only and is not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that the terms "comprise", "comprising", "include", "including", "contain", "containing", "have", "having", and variations thereof used in this document are, unless the context indicates otherwise, intended to be understood in an inclusive (i.e. non-exclusive) sense, such that the process, method, device, apparatus, or system described herein is not limited to those features, integers, parts, elements, or steps recited but may include other features, integers, parts, elements, or steps not expressly listed and/or inherent to such process, method, device, apparatus, or system. Further, the terms "a" and "an" used herein are intended to be understood as meaning one or more unless explicitly stated otherwise. Moreover, the terms "first", "second", "third" etc. are used merely as labels and are not intended to impose any numerical requirements on or to establish any ranking of importance of their objects. In addition, reference to positional terms, such as "lower" and "upper", used in the above description are to be taken in context of the embodiments depicted in the figures, and are not to be taken as limiting the invention to the literal interpretation of the term but rather as would be understood by the skilled addressee in the appropriate context.

REFERENCE SIGNS 1 gyrostabiliser assembly
2 housing
3 vacuum chamber
4 flywheel
5 flywheel shaft
6 upper bearing
7 lower bearing
8 lubrication system
9 reservoir
10 oil circuit
11 pump
12 pump inlet
13 base of housing
14 return line or conduit
15 channel
16 jetting outlet
17 wall of housing
18 disc-shaped member
19 channel in shaft
Z rotational axis or spin axis of shaft
V partial vacuum
X pivot axis
O oil
L oil level in reservoir

The invention claimed is:

1. A gyrostabiliser assembly comprising:
   a housing defining a chamber for supporting an operating pressure of less than 0.5 bar;
   a flywheel mounted within the chamber for rotation about a spin axis at the operating pressure;
   a flywheel shaft upon which the flywheel is supported and mounted in the housing by first and second spin bearings located at opposite end regions of the shaft for rotation of the flywheel about the spin axis, each of the first and second spin bearings including rolling elements; and
   a lubrication system for the first and second spin bearings configured to supply lubricant to the first and second spin bearings from a reservoir,
   wherein the reservoir is arranged in or on the housing to be at the operating pressure in use and to collect the lubricant from the first and second spin bearings under gravity, and wherein the first and second spin bearings are arranged in the housing to be at the operating pressure, with the first and second spin bearings being open to the chamber so that lubricant from the first and second spin bearing contacts the flywheel, and
   wherein the lubrication system includes a jetting outlet directed at each of the first and second spin bearings for delivery of the lubricant targeted directly at the rolling elements in each of the first and second spin bearings.

2. The gyrostabiliser assembly according to claim 1, wherein the first and second bearings are configured and arranged within the housing such that lubricant circulated to the first and second bearings drains out of each respective bearing for return to the reservoir under gravity.

3. The gyrostabiliser assembly according to claim 1, wherein the chamber of the housing is bounded by walls, the walls of the housing form a heat exchanger for the lubricant, optionally via a cooling medium provided in the walls and/or optionally via fin elements formed in the walls, as the lubricant returns to the reservoir under gravity.

4. The gyrostabiliser assembly according to claim 1, comprising a spin motor for driving rotation of the flywheel about the spin axis, wherein the spin motor is mounted within the chamber.

5. The gyrostabiliser assembly according to claim 1, comprising a spin motor for driving rotation of the flywheel about the spin axis, wherein the spin motor is mounted outside of the chamber and is coupled to the flywheel shaft via either a magnetic sealed coupling or a shaft connection.

6. The gyrostabiliser assembly according to claim 1, wherein the operating pressure is a partial vacuum such that the chamber within which the flywheel is mounted forms a vacuum chamber.

7. The gyrostabiliser assembly according to claim 1, wherein the lubricant is a liquid under the operating pressure and temperature and typically comprises oil, such as a synthetic oil.

8. The gyrostabiliser assembly according to claim 1, wherein the flywheel shaft is mounted in an essentially vertical orientation within the housing for rotation about an essentially vertical spin axis, wherein the first and second bearings comprise an upper spin bearing and a lower spin bearing, respectively.

9. The gyrostabiliser assembly according to claim 8, further comprising a member, such as a disc-shaped member, rigidly attached to the flywheel shaft for rotation therewith and arranged below the upper spin bearing for catching the lubricant flowing down from the upper spin bearing and distributing that lubricant radially outwards onto inner walls of the housing enclosing the chamber for return to the reservoir under gravity.

10. The gyrostabiliser assembly of claim 1, wherein the lubricant from the first and second spin bearings that contacts the flywheel provides heat transfer from the flywheel.

11. The gyrostabiliser assembly of claim 10, wherein the rolling-elements of each of the upper and lower spin bearings are held and movable between an inner bearing race fixed to the flywheel shaft and an outer bearing race fixed to the housing, wherein heat from the inner bearing race passes to the flywheel shaft and to the flywheel that is integral with, or fixed on, the flywheel shaft.

12. The gyrostabiliser assembly according to claim 1, wherein the lubrication system comprises at least one pump for circulating the lubricant to the first and second spin bearings, wherein the at least one pump is arranged such that the lubricant in the reservoir provides a pressure head at an inlet of the pump.

13. The gyrostabiliser assembly according to claim 12, wherein the pump is arranged within the reservoir submerged in the lubricant, or wherein the pump is arranged in or on the housing with the inlet of the pump in fluid communication with the reservoir at a level spaced below a level of the lubricant held in the reservoir.

14. The gyrostabiliser assembly according to claim 12, wherein the pump is a positive displacement pump.

15. A gyrostabiliser assembly for a marine vessel comprising:
    a housing defining a chamber for supporting at least a partial vacuum;
    a flywheel mounted within the chamber for rotation about a spin axis at the partial vacuum;
    a flywheel shaft upon which the flywheel is supported and mounted in the housing for rotation of the flywheel about the spin axis, the flywheel shaft being rotatably supported by a first rotary bearing located at one end region of the shaft and a second rotary bearing located at an opposite end region of the shaft, each of the first and second rotary bearings including rolling elements or sliding elements; and
    a lubrication system configured to supply lubricant to the first and second rotary bearings from a lubricant reservoir, wherein the reservoir is arranged in or on the housing to be under the partial vacuum and to collect lubricant from the first and second rotary bearings under gravity, wherein the first and second rotary bearings are arranged in the housing for operation under the partial vacuum with the first and second rotary bearings open to the chamber so that lubricant from the first and second rotary bearings contacts the flywheel, and wherein the lubrication system includes a jetting outlet directed at the rolling elements or sliding elements in each of the first and second rotary bearings for targeted delivery of the lubricant directly to the rolling elements or sliding elements in the first and second rotary bearings.

16. The gyrostabiliser assembly of claim 15, wherein the lubrication system comprises at least one pump for circulating the lubricant to the first and second rotary bearings, wherein the at least one pump is arranged such that the lubricant in the reservoir provides a pressure head at an inlet of the pump.

17. The gyrostabiliser assembly of claim 15, wherein the first and second rotary bearings are configured and arranged within the housing such that lubricant circulated to the first and second- bearings drains out of each respective rotary bearing for return to the reservoir under gravity.

18. The gyrostabiliser assembly of claim 15, further comprising a member, such as a disc-shaped member, rigidly attached to the flywheel shaft for rotation therewith and arranged below the upper spin bearing for catching the lubricant flowing down from the upper spin bearing and distributing that lubricant radially outwards onto inner walls of the housing enclosing the chamber for return to the reservoir under gravity.

19. The gyrostabiliser assembly of claim 15, wherein the chamber of the housing is bounded by walls, and wherein the walls of the housing form a heat exchanger for the lubricant as the lubricant returns to the reservoir under gravity.

20. The gyrostabiliser assembly of claim 19, wherein the walls of the housing form a heat exchanger for the lubricant via a cooling medium provided in the walls of the housing or via fin elements formed in the walls of the housing.

21. A marine vessel, especially a boat or motor yacht, comprising a gyrostabiliser assembly including:
   a housing defining a chamber for supporting an operating pressure of less than 0.5 bar;
   a flywheel mounted within the chamber for rotation about a spin axis at the operating pressure;
   a flywheel shaft upon which the flywheel is supported and mounted in the housing by first and second spin bearings located at opposite end regions of the shaft for rotation of the flywheel about the spin axis, each of the first and second spin bearings including rolling elements or sliding elements; and
   a lubrication system for the first and second spin bearings configured to supply lubricant to the first and second spin bearings from a reservoir,
   wherein the reservoir is arranged in or on the housing to be at the operating pressure in use and to collect the lubricant from the first and second spin bearings under gravity, and wherein the first and second spin bearings are arranged in the housing to be at the operating pressure, with the first and second spin bearings being open to the chamber so that lubricant from the first and second rotary bearings contacts the flywheel, and
   wherein the lubrication system includes a jetting outlet arranged at each of the first and second spin bearings for targeted delivery of the lubricant jetted directly at the rolling elements or sliding elements in each of the first and second spin bearings.

* * * * *